July 18, 1939. A. S. VAN HALTEREN 2,166,695
WHEEL
Original Filed April 18, 1935 2 Sheets-Sheet 1
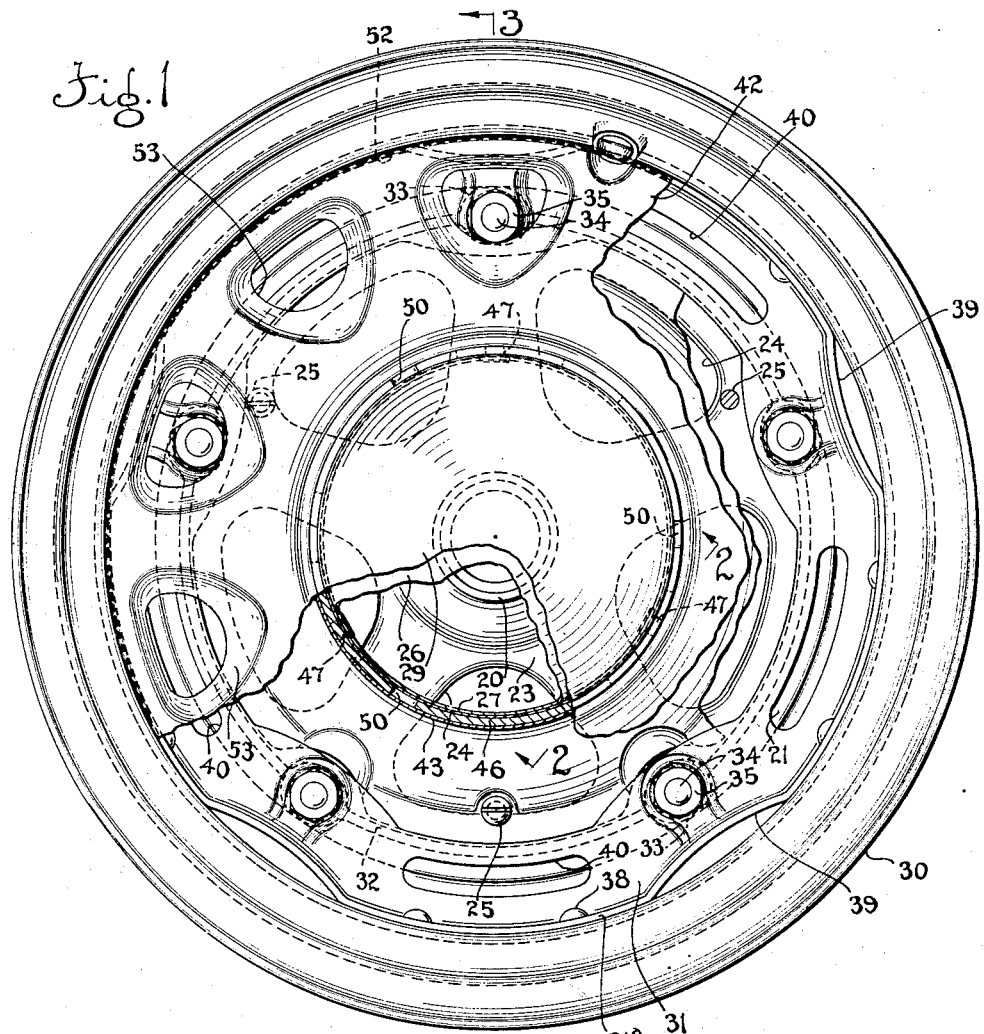
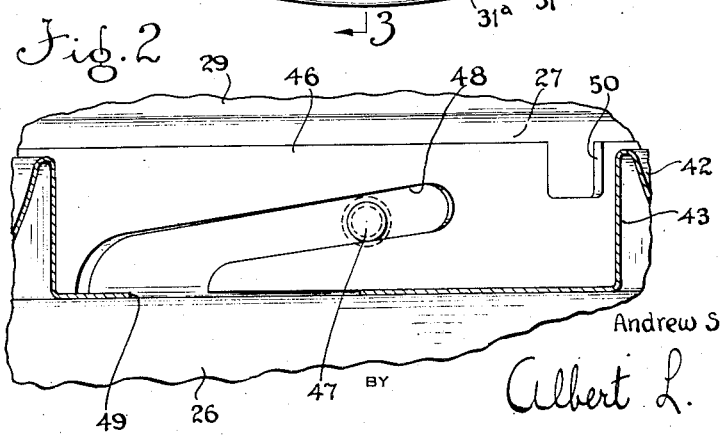
INVENTOR
Andrew S. Van Halteren
BY Albert L. Ely
ATTORNEY July 18, 1939.  A. S. VAN HALTEREN  2,166,695
WHEEL
Original Filed April 18, 1935  2 Sheets-Sheet 2

INVENTOR
Andrew S. Van Halteren
BY
Albert L. Ely
ATTORNEY

Patented July 18, 1939

2,166,695

UNITED STATES PATENT OFFICE 2,166,695

WHEEL

Andrew S. Van Halteren, Lansing, Mich., assignor, by mesne assignments, to The Firestone Tire & Rubber Company, Akron, Ohio, a corporation of Ohio Original application April 18, 1935, Serial No. 17,020. Divided and this application April 18, 1935, Serial No. 17,021

3 Claims. (Cl. 301—6)

This application is a division of my application Serial No. 17,020, filed April 18, 1935, which matured into Patent No. 2,130,207, dated September 13, 1938.

This invention relates to vehicle wheels, and more especially it relates to automobile wheels comprising a hub, brake drum, and removable tire-supporting rim.

The widespread use of low-pressure pneumatic tires with corresponding decrease in the diameter of tire rims, and the increased speed of automobiles which has required the use of larger brake drums, has resulted in the common practise of mounting the tire rims directly upon the brake drums. The construction mentioned has not heretofore been without some unsatisfactory features. When the rim had complete circumferential connection with the brake drum, frictional heat from the latter was conducted to the rim with resultant damage to tire and tube, and difficulty was encountered in providing circulation of air about the brake drum to cool the same. When the rim was connected to the brake drum locally at spaced points circumferentally thereof, jars and jolts to the tire and rim were translated to corresponding local regions of the brake drum with the result that the latter became distorted and out of round and subject to unequal wear and impaired efficiency.

The chief objects of this invention are to provide an improved vehicle wheel of the character mentioned wherein heat transfer from brake drum to tire rim largely is avoided; and wherein forces applied locally to the tire and rim are cushioned between the rim and brake drum, and translated to a relatively large area of the latter. A further object is to provide a construction which permits the circulation of air to and about the brake drum. Other objects will be manifest.

Of the accompanying drawings:

Figure 1 is a front elevation of a vehicle wheel embodying the invention, in its preferred form, parts being broken away and in section for clearness of illustration;

Figure 2 is a section on the line 2—2 of Figure 1;

Figure 3:
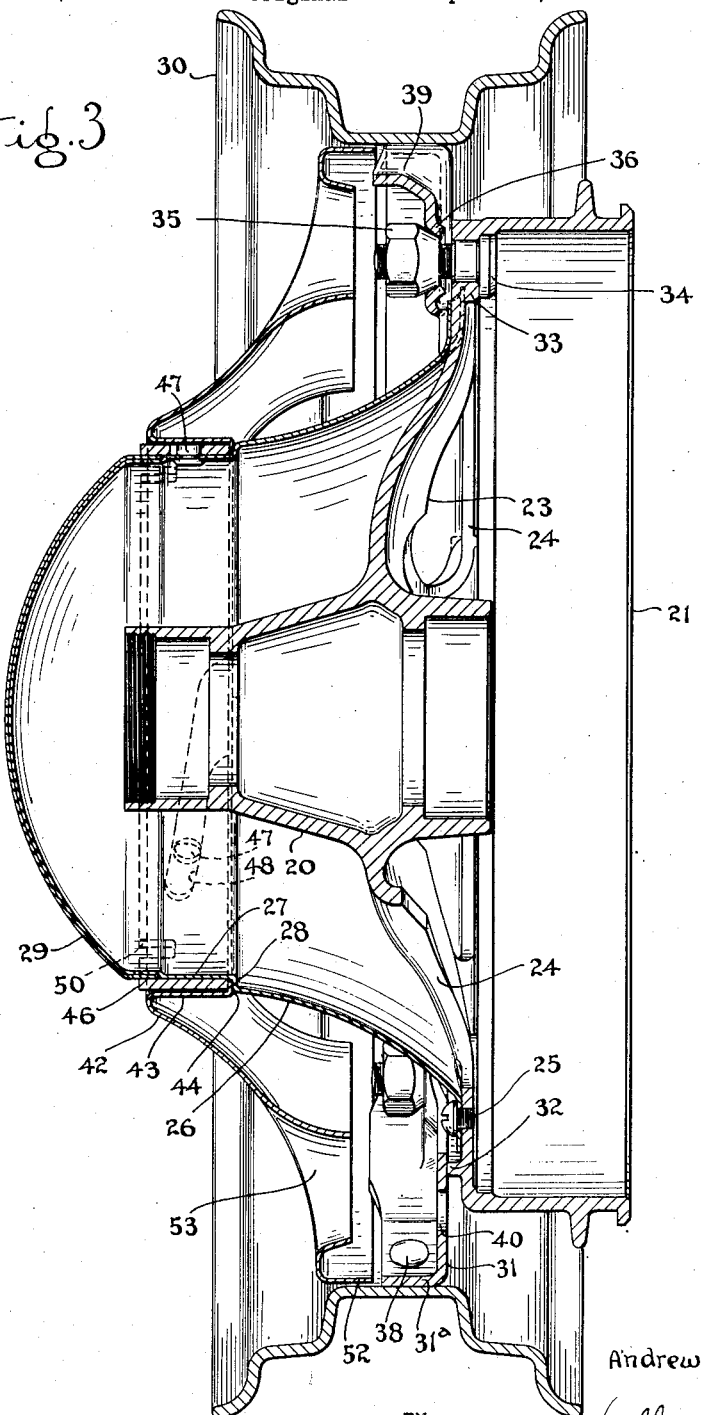
Figure 3 is a section on the line 3—3 of Figure 1.

Referring now to the drawings, especially Figures 1 and 3 thereof it will be seen that the improved vehicle wheel comprises a hub 20 and a brake drum 21 which constitute a unitary structure through the agency of an intervening web 23, the latter being apertured at 24, 24 to reduce weight and to conserve material. Secured to the front side of the web 23 by screws 25, 25 is a dust cover 26 that is of general conoidal shape, said dust cover being formed near its apex with a circumferential cylindrical portion 27 that is concentric with the axis of the wheel, the apex of the dust cover being outwardly convex. A shoulder 28 is formed at the rear margin of cylindrical portion 27. An ornamental hub cap 29 is permanently attached to the apex of the dust cover, the margin of the hub cap extending to the cylindrical portion 27.

The improved vehicle wheel includes a tire-supporting rim 30, herein shown as a drop-center rim although any standard rim with removable side flange may be employed, said rim being removably attached to the brake drum 21 by means of an endless driving ring 31. To this end the front face of the brake drum is formed with a relatively narrow, concentric, upstanding rib 32, Figure 3, outside the base of dust cover 26, said rib merging with a plurality of apertured bosses, such as the boss 33, Figure 3, disposed at equally spaced points circumferentially of said rib 32.

Extending through apertured bosses 33 are respective retaining bolts 34 that extend through suitable bolt holes in the driving ring and have coned nuts 35 threaded thereon. Preferably said bolt holes in the driving ring are formed with circumferential beads or tapered marginal flanges 36, Figure 3, which fit flush against the conical portion of nuts 35, the arrangement being such that driving torque is transmitted to the bolts 34 through the nuts 35 whereby shearing of the bolts is obviated, and relative angular movement between driving ring and brake drum is prevented.

The driving ring 31 is angular in transverse section, being formed with a circumferential portion or flange 31a that extends laterally and forwardly from its outer periphery, and engages the inner face of the rim 30 to which it is permanently secured by a plurality of rivets 38, 38, with the result that the driving ring braces and reinforces the rim. In those regions of the driving ring wherein the bolts 34 are located, said driving ring including flange 31a is arcuately bent parallel to the plane of the wheel to provide radially inwardly extending, arcuate re-entrants 39, 39 of substantial length, which re-entrants provide local spaces between the inner periphery of the rim and the driving ring.

Between adjacent re-entrants the driving ring is formed with elongate arcuate slots 40, 40. The latter and the spaces between the re-entrants and the rim provide means for effecting a circulation of air past the driving ring and into contact with the brake mechanism to cool the said brake mechanism.

The feature of mounting the driving ring 31 on the relatively narrow rib 32 on the brake drum restricts the transfer of heat therebetween, and presence of the re-entrants 39 in the driving ring retards the transfer of heat from driving ring to rim, so that the rim is not unduly heated by frictional heat generated during braking. The re-entrants 39 give the driving ring a modicum of resilience, and, being coincident with the bolts 34, prevent impacts delivered upon the tire and rim from exerting a direct radial pressure upon the brake drum, thereby obviating local distortion of the latter and consequent deleterious effects thereof.

Removably mounted upon the front of the wheel upon dust cover 26 and extending substantially to rim 30 is an ornamental sheet metal cover 42 of general frusto-conical shape. At its inner, smaller perimeter the cover 42 is inwardly turned so as to provide a concentric cylindrical portion 43 that is somewhat larger than the cylindrical portion 27 of dust cover 26. The inner margin of cylindrical portion 43 is formed with a radially inwardly directed flange 44 that defines an opening slightly larger than the outside diameter of cylindrical portion 27. When mounted, the cylindrical portion 43 of cover 42 circumscribes cylindrical portion 27 of dust cover 26 and flange 44 laterally abuts the shoulder 28 at the inner margin of said cylindrical portion 27.

The ornamental cover 42 is retained in place on the dust cover 26 by means of an endless locking ring 46 that is mounted upon cylindrical portion 27 of said dust cover, between the latter and cylindrical portion 43 of the ornamental cover, said locking ring being adapted to hold flange 44 of cover 42 firmly against shoulder 28 of dust cover 26. To this end a plurality of studs 47, 47 are riveted upon the outer peripheral surface of cylindrical portion 27, and the locking ring 46 is formed with correspondingly disposed, oblique bayonet slots 48 that open onto its inner margin. The arrangement is such that when the studs 47 are engaged in bayonet slots 48 of the locking ring, angular movement of the latter in one direction will move it axially into engagement with flange 44 of cover 42 and thereby to urge said flange against shoulder 28 as previously described.

The outer margin of locking ring 46 is formed with a plurality of notches 50, 50 for the reception of a suitable tool by means of which the locking ring may be angularly turned. The flange 44 of cover 42 is cut away at a plurality of points 49, as shown in Figure 2, so as to pass studs 47 in the mounting of the cover.

The outer perimeter of the cover 42 preferably is formed with a flange 52 that is positioned inside the inner perimeter of rim 30, in spaced relation thereto so that the cover is easily mounted notwithstanding such slight out of roundness as subsequently occurs in most tire rims. The arrangement also avoids noise and squeaks due to any relative movement of the tire rim and ornamental cover. It is desirable that the cover 42 be so constructed that air can pass therethrough for the purpose of circulating about brake drum 21 to cool the same, and to this end said cover is made in simulation of a spoked wheel, with apertures 53, 53 between the simulated spokes.

The invention provides a vehicle wheel of attractive appearance and efficient operation, which is easily assembled and disassembled, and which achieves the other advantages set out in the foregoing statement of objects.

Other modifications may be resorted to without departing from the spirit of the invention or the scope of the appended claims.

What is claimed is:

1. In a vehicle wheel the combination of a brake drum, a tire rim, an endless driving ring supporting said tire rim upon said brake drum, said driving ring comprising a portion disposed parallel to the plane of the wheel, said portion being deformed radially at circumferentially spaced points to provide a plurality of circumferentially spaced inwardly extending re-entrants, and means locally supporting the driving ring on the brake drum in the region of the re-entrants, the regions between re-entrants being otherwise unsupported and free to flex radially.

2. In a vehicle wheel the combination of a brake drum, a tire rim, an endless driving ring connecting said tire rim to said brake drum, said driving ring comprising an axially disposed portion in engagement with the tire rim, and a portion disposed parallel to the plane of the wheel in laterally abutting relation to said brake drum, said ring being deformed radially at circumferentially spaced points to provide a plurality of inwardly extending re-entrants, the portion that is parallel to the plane of the wheel being formed with arcuate slots between adjacent re-entrants, each of which slots is of lesser lineal extent than the adjacent face of the ring that is in contact with the tire rim.

3. In a vehicle wheel the combination of a brake drum, a tire rim, an endless driving ring of angular cross-section between said drum and ring, said driving ring having one leg thereof disposed in a plane parallel to the plane of the wheel, said ring being deformed radially at a plurality of circumferentially spaced points to provide spaced, arcuate, inwardly-extending re-entrants, means securing the other leg of the driving ring permanently to the tire rim between said re-entrants, and means for removably securing the first-mentioned leg of the driving ring to the brake drum in the region of said re-entrants, said leg of the driving ring that is secured to the brake drum being formed with arcuate slots between adjacent re-entrants and outwardly of the brake drum, each of said slots being shorter than the distance between adjacent re-entrants.

ANDREW S. VAN HALTEREN.